W. S. BAIRD.
SNAPPING ROLL FOR CORN HARVESTING MACHINES.
APPLICATION FILED MAR. 22, 1918.
1,295,255. Patented Feb. 25, 1919.
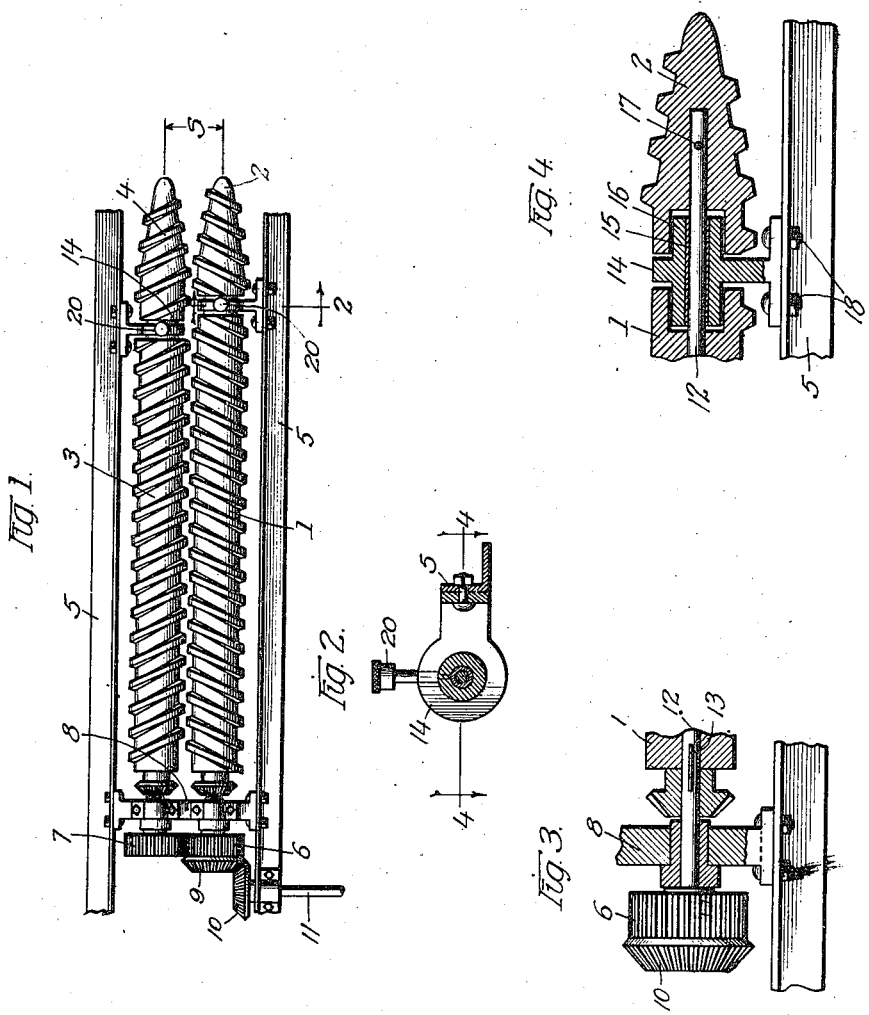

UNITED STATES PATENT OFFICE.

WILLIAM SEWARD BAIRD, OF DECATUR, ILLINOIS, ASSIGNOR TO BAIRD CORN HUSKER CO., OF CHAMPAIGN, ILLINOIS, A CORPORATION OF SOUTH DAKOTA.

SNAPPING-ROLL FOR CORN-HARVESTING MACHINES.

1,295,255.          Specification of Letters Patent.     Patented Feb. 25, 1919.

Application filed March 22, 1918. Serial No. 223,921.

*To all whom it may concern:*

Be it known that I, WILLIAM SEWARD BAIRD, a citizen of the United States, residing at Decatur, in the county of Macon and State of Illinois, have invented certain new and useful Improvements in Snapping-Rolls for Corn-Harvesting Machines, of which the following is a description.

My invention belongs to that general class of devices known as corn harvesting machines, and relates particularly to improved snapping mechanism therefor having among its objects the production of a device of the kind described that is simple, efficient, convenient, durable and satisfactory. The invention has particularly among its objects the production of snapping rolls having greatly increased stalk receiving capacity at the front and a construction in which the distance between the bearings is reduced without reducing the lengths of the rolls. It has among its further objects the production of snapping rolls of the kind described in which the bearings are so disposed that greater hill clearance is obtained, and the bearings are protected from dirt as well as being higher up from the dirt, so that they have greater life or use as well as operate more easily. Many other objects and advantages of the construction herein shown and described will be obvious to those skilled in the art from the disclosures herein given.

To this end, my invention consists in the novel form, construction, arrangement and combination of parts herein shown and described and more particularly pointed out in the claims.

In the drawings, wherein like reference characters indicate like or corresponding parts, Figure 1 is a top plan view of my improved form of snapping rolls;

Fig. 2 is a sectional view taken substantially on line 2—2 of Fig. 1;

Fig. 3 is a sectional view through the rear end of one of the rolls; and

Fig. 4 is a sectional view taken substantially on line 4—4 of Fig. 2 through the forward end of one of the rolls and bearing.

Referring to the drawings, 1 represents a snapping roll of suitable material, size and form, provided with an extending roll part 2 at the forward end, and 3 represents a similar coöperating roll formed with a similar end 4. The rolls shown are carried by the frame 5—5 or the equivalent for this purpose, and are provided with meshing gears 6 and 7, one of which may be driven by the other. As shown, a shaft 12 extends through each roll, a roll being secured thereon by a key 13 or equivalent means for the purpose, so that as the shafts are rotated the rolls will be driven. The shafts extend through suitable bearings or bushings carried by the cross bar 8 or its equivalent. I have shown one shaft provided with a gear 9 arranged to mesh with gear 10 driven by shaft 11, shaft 11 being driven in any suitable manner.

The forward end of the rolls are supported by bearings 14, one for each roll, and which are preferably arranged with one in advance of the other, as shown, so that they are not directly opposite. I have shown the brackets 14 formed with an extended part 16, and provided with a bushing 15 or bearing for the shaft 12, which projects therethrough. The roll end 2 or 4, as the case may be, is secured on its respective shaft by a pin or bolt 17, or equivalent means for the purpose. The brackets 14 may be secured to the bars 5 by bolts 18 or equivalent means. I prefer to chamber the roll parts so that the extending parts 16 at each side of the bracket project into the roll part, but the same are preferably so proportioned that a space is formed at each end of the bearing. The purpose of this is to prevent any end bearing on the bracket, it being preferred to have the end or thrust bearing at the rear end of the roll. I have shown grease cups 20, by means of which the bearings may be lubricated, and cutting of the shaft or bearing prevented.

The parts 2 and 4 are preferably tapered as most clearly shown in Figs. 1 and 4, and it will be noted that in this construction in which the bearings are not at the ends of the rolls, the full space S is provided at the ends of the rolls, the same being equal to the distance between the center axes of the rolls. This allows full space into which the stalks may be directed, so that the stalk receiving capacity is considerably larger or wider than would be the case if the bearings were at the ends of parts 2 and 4. The bearings being staggered, or that is not arranged opposite each other, the stalk is fed along without any dead space or point where the same would not be fed rearwardly. The bearings being higher up and inside or between the roll parts, they are to a large extent protected, and dirt prevented from getting into the bearing, the same affording greater clearance between the bearings and hill or ground. This also reduces the distance between the bearings at the two ends of each roll, which is ordinarily desirable. I have shown the rolls as provided with grooves and beads forming what might be termed threads, it being understood, however, that the particular form of roll may be as desired, this depending upon the preference of the manufacturer and user.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:—

1. In a corn harvesting machine of the kind described and in combination, a plurality of rolls, said rolls each consisting of a shaft having a roll part secured thereon intermediate the ends of the shaft, and a second roll part secured on each of said shafts at one end thereof adjacent one end of the other roll part thereon, the adjacent ends of said parts provided with a recess, a bearing for said shaft arranged to carry the shaft at a point between said parts, said bearing projected into the recess of each part.

2. In a corn harvesting machine of the kind described and in combination, a plurality of rolls, said rolls each consisting of a shaft having a roll part secured thereon intermediate the ends of the shaft, one of said parts being slightly longer than the other, and a second roll part secured on each of said shafts at one end thereof adjacent one end of the other roll part thereon, one of said second roll parts being slightly longer than the other, the shorter second roll part being assembled with the longer other roll part, the adjacent ends of said parts provided with a recess, a bearing for said shaft arranged to carry the shaft at a point between said parts, said bearing projected into the recess of each part.

In testimony whereof, I have hereunto signed my name in the presence of two subscribing witnesses.

WILLIAM SEWARD BAIRD.

Witnesses:
   Roy W. Hill,
   Charles I. Cobb.